UNITED STATES PATENT OFFICE.

CARL ALEXANDER MARTIUS, OF BERLIN, GERMANY, ASSIGNOR TO THE ACTIEN-GESELLSCHAFT FÜR ANILIN FABRIKATION, OF SAME PLACE.

PROCESS OF MAKING AZO DYES.

SPECIFICATION forming part of Letters Patent No. 456,627, dated July 28, 1891.

Original application filed August 22, 1888, Serial No. 283,462. Divided and this application filed January 24, 1890. Serial No. 337,997. (No specimens.) Patented in England April 20, 1888, No. 5,910.

*To all whom it may concern:*

Be it known that I, CARL ALEXANDER MARTIUS, of Berlin, in the Kingdom of Prussia and Empire of Germany, have invented certain new and useful Improvements in the Manufacture of Coloring-Matters, (for which I have obtained a patent in England, No. 5,910, dated April 20, 1888;) and I do hereby declare that the following is a full, clear, and exact description of the invention, which will enable others skilled in the art to which it appertains to make and use the same.

This invention relates to certain improvements in the production of coloring-matters, more fully set forth hereinafter.

An alpha-naphthol disulphonic acid is formed by treating naphthaline disulphonic acid (as obtained by treating naphthaline with sulphuric acid, monochlorhydrine, or fuming sulphuric acid) with nitric acid, then reducing the alpha-nitronaphthaline disulphonic acids so formed to alpha-amidonaphthaline disulphonic acid and converting the said alpha-amidonaphthaline disulphonic acid into the corresponding alpha-naphthol disulphonic acid. This alpha-naphthol disulphonic acid gives, by the combination with diazo compounds, red, brown, violet, or bluish azo coloring-matters, of which the following are examples:

*Example 1.*—Coloring-matter from the new alpha-naphthol disulphonic acid and xylidine. 15.75 kilos of hydrochlorate of xylidine are dissolved in one hundred liters of water and acidulated with twelve kilos of muriatic acid. To this is slowly added, under continuous stirring, a solution of 6.9 kilos of nitrite of sodium in fifty liters of water. The solution of diazoxylol thus formed is entered into seven hundred kilos of water containing 34.8 kilos of the sodium salt of the new alpha-naphthol disulphonic acid, and carbonate of sodium enough to keep the liquid alkaline until the process is completed. The formed dye-stuff is separated by precipitation with common salt, pressed and dried. It dyes wool with yellowish red shades in an acidulated bath. If in the above-described example the 15.75 kilos of hydrochlorate of xylidine are replaced by the equivalent quantity of the hydrochlorates of cumidine, alpha-naphthylamine, beta-naphthylamine, amido-azo-benzole, and amidoazo-toluol, dye-stuffs are obtained which likewise yield on woolen stuffs, in acidulated baths, very fair shades. The coloring-matter from cumidine dyes red; alpha-naphthylamine, brown; beta-naphthylamine, red brown; amidoazo-benzole, brown; amidoazo-toluol, brown.

*Example 2.*—If in example 1 the xylidine is replaced by equivalent quantities of naphthionic acid, sulphanilic acid, azoalpha-naphthylamine, alpha-naphthylamine, disulphonic acid, azoalpha-naphthylamine or beta-naphthylamine disulphonic acid azoalpha-naphthylamine, useful coloring-matters are obtained which yield on woolen stuffs, in acidulated baths, the following shades: The coloring-matter from naphthionic acid dyes brown red; beta-naphthylamine, beta-sulphonic acid, red; sulphanilic acid, azoalpha-naphthylamine, brown; beta-naphthylamine alpha-sulphonic acid azoalpha-naphthylamine, brown; alpha-naphthylamine disulphonic acid azoalpha-naphthylamine, red violet; beta-naphthylamine disulphonic acid—G—azoalpha-naphthylamine, bluish black.

This application is a division of my original application for improvement in azo colors, filed August 22, 1888, Serial No. 283,462.

What I claim is—

The process of producing azo colors, which consists in first forming an alpha-naphthol disulphonic acid by treating naphthaline disulphonic acid with nitric acid, reducing the alpha-nitro naphthaline disulphonic acids so formed to alpha-amido naphthaline disulphonic acid and converting said alpha-amido naphthaline disulphonic acid into the corresponding compound alpha-naphthol disulphonic acid; secondly, forming an diazo derivative of an amido compound, such as xylidine cumidine, alpha-naphthylamine, &c., and, thirdly, adding the said alpha-naphthol disulphonic acid to the diazo compound so formed.

In testimony that I claim the foregoing as my own I affix my signature in presence of two witnesses.

CARL ALEXANDER MARTIUS.

Witnesses:
ARTHUR C. HALL,
HENRY BLAIR,
    9 *Mount Street, Manchester.*